US011245595B2

(12) United States Patent
Madden et al.

(10) Patent No.: US 11,245,595 B2
(45) Date of Patent: Feb. 8, 2022

(54) MANAGEMENT OF USER INTERFACES WITHIN A NETWORK

(71) Applicant: Sensia LLC, Houston, TX (US)

(72) Inventors: Thomas M. Madden, Duncan, OK (US); Robert Diederichs, Edmonton (CA); Jerry Yee, Edmonton (CA)

(73) Assignee: Sensia LLC, Houston, TX (US)

( * ) Notice: Subject to any disclaimer, the term of this patent is extended or adjusted under 35 U.S.C. 154(b) by 174 days.

(21) Appl. No.: 14/207,217

(22) Filed: Mar. 12, 2014

(65) Prior Publication Data

US 2015/0261398 A1  Sep. 17, 2015

(51) Int. Cl.
*G06F 17/00* (2019.01)
*H04L 12/24* (2006.01)
*G06F 9/451* (2018.01)

(52) U.S. Cl.
CPC .............. *H04L 41/22* (2013.01); *G06F 9/451* (2018.02)

(58) Field of Classification Search
CPC ......... G06F 17/30286; G06F 17/30179; G06F 9/451; H04L 41/22
See application file for complete search history.

(56) References Cited

U.S. PATENT DOCUMENTS 6,680,955 B1 * 1/2004 Le ........................... H04L 29/06
                                                                370/477
7,631,265 B1   12/2009 Quinn 2002/0045484 A1    4/2002  Eck et al.
2004/0236443 A1 * 11/2004  Ware ................. G05B 19/0421
                                                              700/90
2005/0193143 A1    9/2005  Myers et al.
(Continued)

FOREIGN PATENT DOCUMENTS

JP          H08-292802 A      11/1996
JP          2002-202811 A      7/2002
(Continued)

OTHER PUBLICATIONS

International Search Report and Written Opinion Issued in Corresponding PCT Application No. PCT/US2015/019816, dated May 19, 2015 (13 Pages).
(Continued)

*Primary Examiner* — Andrew T McIntosh
(74) *Attorney, Agent, or Firm* — Foley & Lardner LLP (57) ABSTRACT

An apparatus, system, and method to manage user interfaces within a network, such as a wireless network at least partially included within a hazardous area. The method includes creating an application user interface based upon data content included within a single application binary file, serving the application user interface, creating a device user interface based upon data content included within a single device binary file, and serving the device user interface, in which the data content of the single application binary file and the data content of the single device binary file are identical. Additionally or alternatively, the method includes sending the single device binary file to an application computer through a serial connection to create an application user interface, in which the device user interface and the application user interface are configured to be identical.

20 Claims, 3 Drawing Sheets

(56) References Cited

U.S. PATENT DOCUMENTS

| | | | |
|---|---|---|---|
| 2007/0040110 A1* | 2/2007 | Ellis | E21B 47/082 250/266 |
| 2009/0076749 A1* | 3/2009 | Nasle | G05B 17/02 702/62 |
| 2009/0157839 A1 | 6/2009 | Diederichs et al. | |
| 2010/0192167 A1* | 7/2010 | Feies | G06F 8/38 719/331 |
| 2010/0251150 A1* | 9/2010 | Walter | G06F 9/4443 715/765 |
| 2010/0251233 A1* | 9/2010 | Majewski | G06F 3/038 718/1 |
| 2010/0251266 A1* | 9/2010 | Majewski | G06F 3/0486 719/323 |
| 2011/0078678 A1 | 3/2011 | Matthews | |
| 2011/0175701 A1* | 7/2011 | Kobayashi | G05B 15/02 340/3.7 |
| 2012/0166637 A1 | 6/2012 | White, Jr. et al. | |
| 2014/0277594 A1* | 9/2014 | Nixon | G05B 11/01 700/17 |

FOREIGN PATENT DOCUMENTS

| | | |
|---|---|---|
| JP | 2003-006780 A | 1/2003 |
| JP | 2003-134261 A | 5/2003 |
| JP | 2003-529247 A | 9/2003 |
| JP | 2007-500056 A | 1/2007 |
| JP | 2008-002890 A | 1/2008 |
| JP | 2008-176403 A | 7/2008 |
| JP | 2010-250435 A | 11/2010 |
| JP | 2010-271850 A | 12/2010 |
| WO | 2002037474 A1 | 5/2002 |
| WO | 2007005082 A2 | 1/2007 |
| WO | WO-2013/163028 | 10/2013 |

OTHER PUBLICATIONS

JP Final Office Action on JP Appl. Ser. No. 2016-556897 dated Mar. 16, 2021, 8 pages (With English Translation).

* cited by examiner

MANAGEMENT OF USER INTERFACES WITHIN A NETWORK

BACKGROUND

Different protection techniques may be used to ensure the safe operation of electrical instruments in hazardous areas. A hazardous area is generally one where flammable gases and/or particles are present, or could be present. Two common protection methods to prevent the accidental ignition of flammable gases or particles include using electrical equipment that is rated as explosion proof and/or intrinsically safe. Explosion proof refers to equipment that is designed to contain an internal explosion resulting from the flammable gases and particulate entering the electronics. This ability to contain an internal explosion prevents subsequent ignition of the surrounding atmosphere. Intrinsic safety requirements are intended to guarantee that instrument operation or failure cannot cause ignition, such as if the instrument is properly installed in an environment that contains explosive gases. This is accomplished by limiting the maximum energy stored in the device in a worst case failure situation. Excessive energy discharge may lead to sparking or excessive heat, which could ignite an explosive environment in which the transmitter may be operating.

Such techniques and tools are highly useful in the process control and measurement industry to allow operators to conveniently communicate with and/or interrogate field devices in a given process installation. Examples of such process installations include petroleum, pharmaceutical, chemical, pulp, and other processing installations. In such installations, the process control and measurement network may include tens or even hundreds of various explosion proof and intrinsically safe field devices. However, communication between one or more devices within a network may be limited, such as by compromising the timeliness or reliability of the communication of data within the network, particularly as an intrinsically safe device within the network may be limited with respect to energy use. For example, communications and bandwidth may be limited within a network, or with a particular device or computer within the network, thereby straining the interactions with the components within the network. Accordingly, it remains a priority to increase the capability of interaction and communication with components within a network, such as a device, particularly in hazardous environments commonly associated with devices that may have limited resources.

BRIEF DESCRIPTION OF THE DRAWINGS

For a detailed description of the preferred embodiments of the present disclosure, reference will now be made to the accompanying drawings in which.

DETAILED DESCRIPTION

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Accordingly, disclosed herein are an apparatus, a system, and a method to manage and/or synchronize user interfaces within a network, such as for an instrument or device. The method may include creating an application user interface based upon data content included within a single application binary file, serving the application user interface, creating a device user interface based upon data content included within a single device binary file, and serving the device user interface, in which the data content of the single application binary file and the data content of the single device binary file are identical. Accordingly, the single application binary file and the single device binary file may be identical, and therefore the application user interface and the device user interface may be identical, such as when viewed and interacted with by a user. The application user interface may be served to an application client through an application web server from an application computer, the device user interface may be served to a user client through a device web server from an embedded device through an Ethernet or Internet connection, in which case the application computer and the embedded device are connected through a serial connection. The method may also include receiving a data content request through the application user interface and determining if the single application binary file comprises data content corresponding to the data content request. If the single application binary file includes the data content corresponding to the data content request, then the data content may be retrieved from the single application binary file. If the single application binary file does not include the data content corresponding to the data content request, then the data content may be retrieved through the serial connection from a device application module of the embedded device. The method may also include receiving the single device binary file from the embedded device to the application computer through the serial connection, and saving the single device binary file as the single application binary file.

In one or more embodiments, the network may be, at least partially, wireless and at least partially positioned or contained within a hazardous area, such as a wellsite. The embedded device may include a flow meter, in which the data content may include configuration data, real-time data, and/or archive data collected or used to configure the flow meter. In particular, the embedded device may include a flow computer, in which the flow computer may take or receive measurements from a flow meter, such as an orifice meter or a turbine flow meter. As such, the real-time data and/or the archive data may include data, such as of a flow rate and a property measured by the embedded device, and the configuration data may include data, such as of an internal pipe diameter and mole fraction of material associated with the embedded device.

Figure 1:
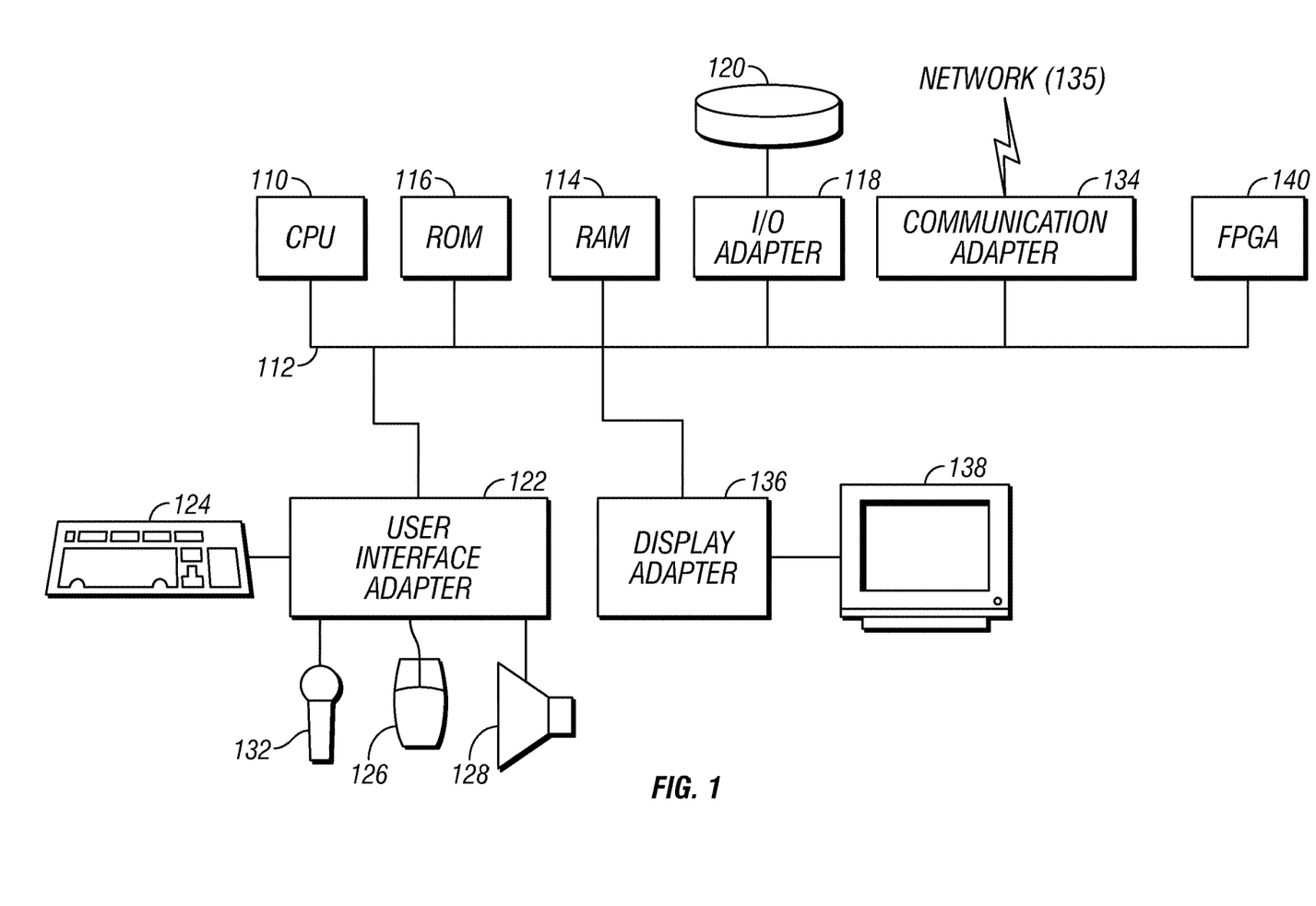
FIG. 1 shows a perspective view of a computer and workstation that may be used in accordance with one or more embodiments of the present disclosure.

In one or more embodiments, an apparatus or system in accordance with the present disclosure may be practiced, such as partially or fully practiced, in the context of a computer, which may include a personal computer and/or an embedded system, such as an embedded device. Accordingly, hardware of a computer in accordance with the present disclosure may include a typical hardware configuration of a workstation, as shown in FIG. 1, in which the workstation may include a central processing unit 110, such as a microprocessor, and a number of other units interconnected via a system bus 112. The workstation shown in FIG. 1 may also include RAM (Random Access Memory) 114, ROM (Read Only Memory) 116, an I/O (input/output) adapter 118 for connecting peripheral devices, such as disk storage units 120, to the bus 112, a user interface adapter 122 for connecting a keyboard 124, a mouse 126, a speaker 128, a microphone 132, and/or other user interface devices, such as a touch screen (not shown), to the bus 112, communication adapter 134 for connecting the workstation to a communication network (e.g., a data processing network), and/or a display adapter 136 for connecting the bus 112 to a display device 138. The workstation may also include a Field Programmable Gate Array (FPGA) 140 with a complete or a portion of an operating system thereon. Further, those skilled in the art will appreciate that the present disclosure may also be implemented on platforms and operating systems other than those mentioned.

Figure 2:
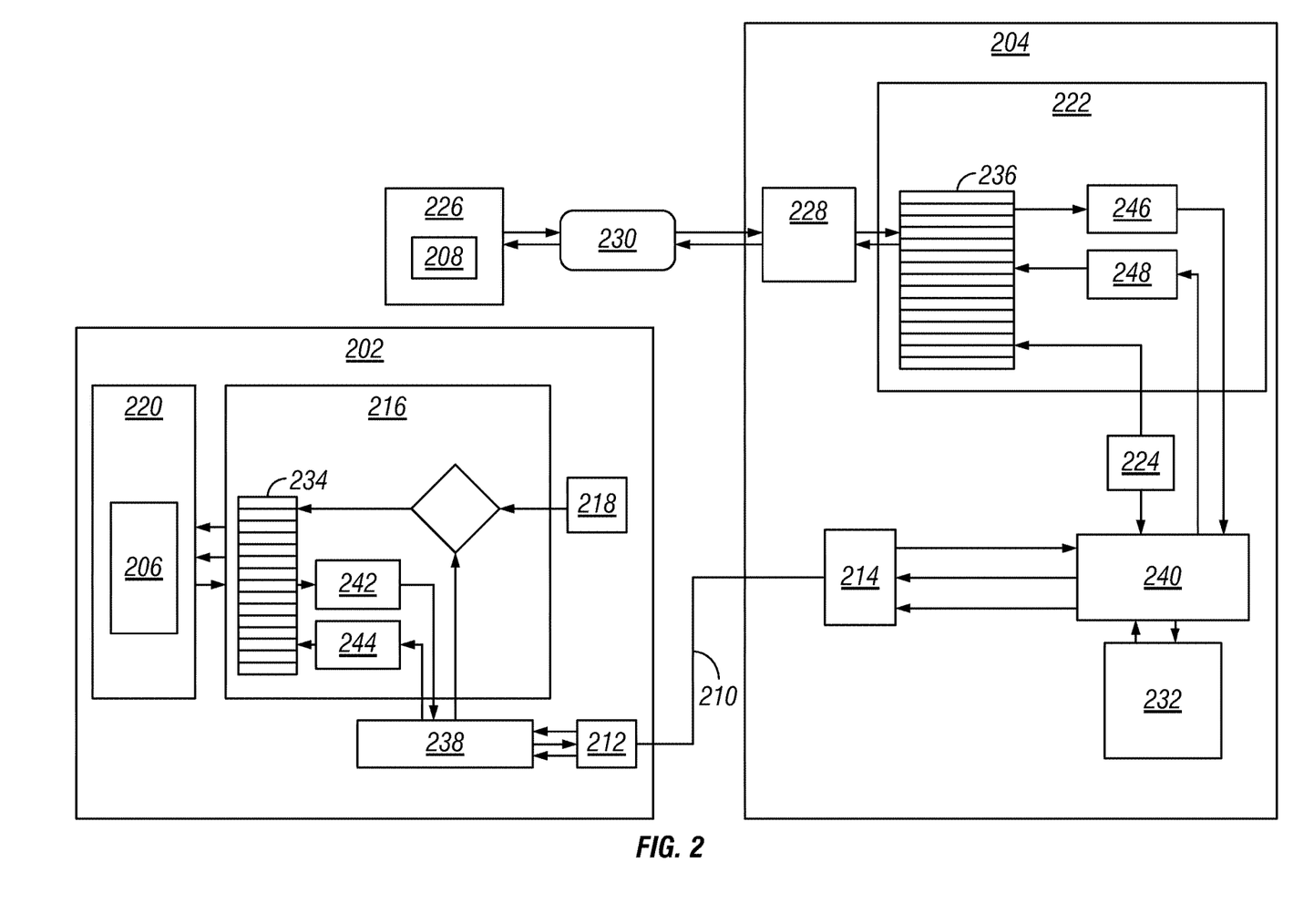
FIG. 2 shows a block diagram of a system and/or network to manage and/or synchronize user interfaces in accordance with one or more embodiments of the present disclosure.

Referring now to FIG. 2, a block diagram of a system and/or network to manage and/or synchronize user interfaces in accordance with one or more embodiments of the present disclosure is shown. The diagram includes a computer application 202, which may be implemented on a computer, such as a general purpose computer as shown in FIG. 1, hosting the computer application 202, and also includes a device module 204, such as firmware and/or software that may be included within and/or implemented with an embedded device, an embedded system, and/or a special-purpose computer. The computer application 202 may include, define, or create an application user interface 206 for a user to interact with the computer application 202, and the device module 204 may include, define, or create a device user interface 208 for a user to interact with the device module 204.

The computer application 202 and the device module 204 may be connected to each other, such as through a serial connection 210. In particular, the serial connection 210 may be a low bandwidth connection, such as a radio connection, that may have a bit rate of about 9600 bps. The serial connection 210 may enable serial communication, such as opposed to parallel communication, between the computer application 202 and the device module 204 such that the computer application 202 and the device module 204 may send and receive one bit of data at a time to each other. In one embodiment, as shown, the computer application 202 may include or be operable with an application serial port 212, and the device module 204 may include or be operable with a device serial port 214, to enable serial communication between the computer application 202 and the device module 204. However, the present disclosure is not so limited, as other methods, components, and/or configurations may be used to enable serial communication between the computer application and the device module, such as USB (Universal Serial Bus).

The computer application 202 may include an application web server 216 and a single application binary file 218. The application web server 216 may use the single application binary file 218, such as the data content included within the single application binary file 218, to create, define, serve, and/or otherwise implement the application user interface 206. For example, the computer application 202 may include an application client 220, such as a web client or a web browser, to display the application user interface 206. The application web server 216 may create the application user interface 206 from the single application binary file 218, in which the application web server 216 may then serve and deliver the application user interface 206 to the application client 220 for display and interaction. Accordingly the single application binary file 218 may include all the data content necessary to create and define the characteristics of the application user interface 206.

Further, the device module 204 may include a device web server 222 and a single device binary file 224. The device web server 222 may use the single device binary file 224, such as the data content included within the single device binary file 224, to create, define, serve, and/or otherwise implement the device user interface 208. For example, the device module 204 may be operable with a user client 226, such as a web client or a web browser, to display the device user interface 208. The user client 226 may be included with and/or implemented on an internet enabled computer or device, thereby enabling the internet enabled computer or device to display the device user interface 208. Accordingly, the device module 204 may include an internet connection 228, such as an Ethernet and/or a wireless connection, thereby enabling the device module 204 to communicate with the user client 226 using the WWW (World Wide Web) 230. The device web server 222 may create the device user interface 208 from the single device binary file 224, in which the device web server 222 may then serve and deliver the device user interface 208 to the user client 226 for display and interaction. Accordingly the single device binary file 224 may include all the data content necessary to create and define the characteristics of the device user interface 208.

In accordance with one or more embodiments of the present disclosure, the single application binary file 218 and the single device binary file 224 may be identical, such as copies of the same binary file. This may enable a user interface defined or created from single binary files that are identical to then also be identical, as when viewed and interacted with by a user. For example, as the data content of the single application binary file 218 is used to create and define the characteristics of the application user interface 206 and the data content of the single device binary file 224 is used to create and define the characteristics of the device user interface 208, the appearance, functionality, and/or interactive experience with the application user interface 206 and the device user interface 208 may also be identical.

Accordingly, a user interacting with the application user interface 206 served up and hosted by the application web server 216 may have identical functionality and access to identical content, or substantially identical functionality and access to substantially identical content (e.g., only small variances) as a user interacting with the device user interface 208 served up and hosted by the device web server 222. Such an embodiment may enable a user to have an identical user experience when interacting with the application user interface 206 or the device user interface 208, despite limitations in communication between the computer application 202 and the device module 204. A single binary file in accordance with the present disclosure, such as the single application binary file and the single device binary file, may be a single file encoded in binary form. As such, the single binary file may include multiple content files, such as web files, in which the files may be indexed and/or compressed within the single binary file. For example, the content files of the single binary file may be compressed within a .ZIP file format and/or may be indexed within the single binary file using headers, footers, and/or the like. Further, data content of the single binary file may include or be written, at least partially, in a web-based or internet supported programming language, such as HTML (HyperText Markup Language) and/or Javascript.

Referring still to FIG. 2, the device module 204 may include a device application module 232, such as to include a computer program related to data content that is available from or through the device module 204. The device application module 232 may refer to an executable file, a library, a script, and/or other types of software. For example, as discussed above, the device module 204 may be included within an embedded device, in which the device application module 232 may be related to the software and/or hardware associated with the dedicated functions of the embedded device.

As discussed above, a system or network of the present disclosure may be, at least partially, positioned or contained within a hazardous area, such as a wellsite. As such, in accordance with one or more embodiments of the present disclosure, the device module may be included or implemented on an embedded device to measure one or more properties and/or characteristics of the wellsite, such as a flow meter and/or any other type of measuring device known in the art. The flow meter may be able to collect one or more measurements related to properties and/or characteristics related to flow through the wellsite.

Accordingly, the embedded device may be able to acquire data content, such as real-time data that may include data or information of flow rates, such as a volumetric flow rate, a mass flow rate, and/or an energy flow rate, and may include one or more other properties and/or characteristics of the wellsite, such as static pressure, differential pressure, and/or temperature related to the flow rates. This data or information may be stored, at least temporarily, within the embedded device such that the embedded device also stores and acquires archive data. Further, the embedded device may be able to acquire configuration data, such as configuration settings associated with the embedded device, real-time data, and/or archive data. An example of configuration data may include an internal pipe diameter and/or mole fraction of material, such as methane, associated with and/or flowing through a flow meter.

The embedded device may be connected to one or more other components, devices, and/or computers, such that the device application module 232 includes data content or information associated the other connected components, devices, and/or computers. For example, in an embodiment in which the embedded device may be a flow meter included within a wellsite, the embedded device may be in communication with other components of the wellsite, such as other flow meters within the wellsite. As such, the device application module 232 may additionally or alternatively acquire information of the other flow meters included within the wellsite, such as configuration data, real-time data, and/or archive data. Accordingly, the device application module 232 may include data and information associated with the embedded device and/or other components, devices, or computers in communication with the embedded device.

As discussed above, a user may interact with the computer application 202 through the application user interface 206 served up and hosted by the application web server 216, and a user may also interact with the device module 204 of the embedded device through the device user interface 208 served up and hosted by the device web server 222. In such an embodiment, the user may request data content using the user interfaces, such as by generating a data content request that is received at or through the application user interface 206 and/or the device user interface 208.

Accordingly, as shown, the application web server 216 may include communications protocols, such as a TCP/IP (Transmission Control Protocol/Internet Protocol) Stack Module 234, to provide and specify how data may be formatted, addressed, transmitted, routed, and/or received with respect to the application web server 216. Accordingly, the TCP/IP Stack Module 234 may be used to assist and serve the application user interface 206, such as by providing data content and/or files from the single application binary file 218, the device application module 232, and/or other component that may be requested through the application user interface 206. Similarly, the device web server 222 may include communications protocols, such as a TCP/IP (Transmission Control Protocol/Internet Protocol) Stack Module 236, to provide and specify how data may be formatted, addressed, transmitted, routed, and/or received with respect to the device web server 222. The TCP/IP Stack Module 234 may then be used to assist and serve the device user interface 208, such as by providing data content and/or files from the single device binary file 224, the device application module 232, and/or other component that may be requested through the device user interface 208.

When a data content request is received through the application user interface 206, the application web server 216 may receive and process the data content request to determine if the data content and/or file associated with and corresponding to the data content request is included within the single application binary file 218. For example, if the data content corresponding to the data content request is included within the single application binary file 218, such as data content corresponding to characteristics of the application user interface 206, then the application web server 216 may be used to retrieve the data content from the single application binary file 218 and serve the data content into and/or through the application user interface 208.

If the data content corresponding to the data content request is not included within the single application binary file 218, such as data content corresponding to configuration data, real-time data, and/or archive data, as discussed above, then, in one or more embodiments, the application web server 216 may be used to retrieve the data content from the device application module 232, such as through the serial connection 210, to serve the data content into and/or through the application user interface 208.

For example, a computer application 202 and/or a device module 204 in accordance with one or more embodiments of the present disclosure may be adapted to serially communicate through the serial connection 210, which may be a relatively low bandwidth connection. As such, the computer application 202 may include an application serial communications protocol module 238 and/or the device module 204 may include a device serial communications protocol module 240 to adapt and configure communications, such as packets, frame, and/or streams of data content, between the computer application 202 and the device module 204, such as to provide and specify how data may be formatted, addressed, transmitted, routed, and/or received with respect to the computer application 202 and/or the device module 240. Furthermore, the computer application 202 may include an encoder 242 and/or a decoder 244 to convert data content and/or other information to facilitate communication between the application web server 216 and the application serial communications protocol module 238, and the device module 204 may include an encoder 246 and/or a decoder 248 to convert data content and/or other information to facilitate communication between the device web server 222 and the device serial communications protocol module 240.

When data content is requested through the application user interface 206 that is not included within the single application binary file 218, the encoder 242 may be used to encode the data content request for use with the application serial communications protocol module 238. For example, the encoder 242 may be used to convert the data content request, such as a packet including the data content request, from a HTTP (HyperText Transfer Protocol) Request format to a format corresponding to the application serial communications protocol module 238. In one or more embodiments, the application serial communications protocol module 238 and/or the device serial communications protocol module 240 may include a communications protocol based upon AJAX (Asynchronous JavaScript and XML (Extensible Markup Language)). Further, in one or more embodiments, the application serial communications protocol module 238 may use or be packaged with binary formatting, in which the encoder 242 may convert data and information from CGI (Common Gateway Interface) of HTML to a binary format in a framed binary stream. The application serial communications protocol module 238 may then be used to compile, adapt, and/or otherwise tailor the data packets for serial communication.

In one embodiment, the application serial communications protocol module 238 may include a serial formatter, in which the serial formatter may be used to strip a packet of verbose information and convert the packet into a binary format for serial communication across the serial connection 210. For example, a packet including data content, such as when in XML, may include a header portion (e.g., opening signal), a footer portion (e.g., closing signal), and/or an error detection portion. The serial formatter may be used to remove the header portion and/or the footer portion from the packet, and possibly even the error detection portion if desired or necessary, to reduce the overall size of the packet for serial communication. This stripped down packet may then be sent across the serial connection 210 and received by the device serial communications protocol module 240. The serial formatter of the device serial communications protocol module 240 may then de-strip the packet to add the header portion, the footer portion, and/or the error detection portion to the packet to return the packet back to the original size.

As the serial communications protocol modules are designed to be in frequent communication with each other, the serial communication protocol modules may take advantage of this arrangement to strip down the size and formatting included within data content packages that are sent between each other. For example, the serial communications protocol modules are each aware of the communications protocol rules and techniques used to compress and pack data and information when sending packets between each other. Accordingly, this redundancy may be taken advantage of by being aggressive when stripping data content packets of formatting, such as the header portion and the footer portion, to reduce the overall size of the packet transmitted across the serial connection 210, as the serial communications protocol modules can reliably de-strip to return the packet to the original size and format for reliable communications.

After the data content corresponding to the data content request is retrieved from the device application module 232, a data content package with the data content may then be compiled and framed, such as by the device application module 232 and/or the device serial communications protocol module 240 to be sent back to the computer application 202. For example, the data content package may be stripped, such as to remove the header portions and/or the footer portions within the data content package, with a device serial formatter included within the device serial communications protocol module 240. The stripped data content package may then be sent across the serial connection 210 and received by the application serial communications protocol module 238 to de-strip the data content package, such as to add the header portions and/or footer portions back into the data content package. The data content package may then be received by the application web server 216 and decoded using the application decoder 244, in which the data content of the data content package may then be served to the application user interface 206 through the application client 220.

Data content requests and data content that is served within or through the device user interface 208 and the device module 204 may be similar to that of the application user interface 206 and the computer application 202. For example, as the device module 204 and the device web server 222 include the encoder 246, the decoder 248, and the device serial communications protocol module 240, these components and modules may be used in a similar process as those described with respect to the encoder 242, the decoder 244, and the application serial communications protocol module 238 of the computer application 204 and the application web server 216. However, in one or more embodiments, as information and data included within the device application module 232 does not need to be transmitted across a serial connection when requested through a data content request from the device user interface 208, the device serial communications protocol module 240 may not be required for stripping or de-stripping packages of data content, as the bandwidth available through the internet connection 228 should be substantially larger than the bandwidth available through the serial connection 210.

As discussed above, a system or network of the present disclosure may be, at least partially, positioned or contained within a hazardous area, such as a wellsite. Further, as discussed above, the device module may be included or implemented on an embedded device to measure one or more properties and/or characteristics of the wellsite, such as a flow meter and/or any other type of measuring device known in the art. The flow meter may be able to collect one or more measurements related to properties and/or characteristics related to flow through the wellsite. The embedded device may be connected to one or more other components, devices, and/or computers within the system and/or network such that the embedded device may collect and store data content or information associated the other connected components, devices, and/or computers. For example, in an embodiment in which the embedded device may be a flow meter included within a wellsite, the embedded device may be in communication with other components of the wellsite, such as other flow meters within the wellsite.

Figure 3:
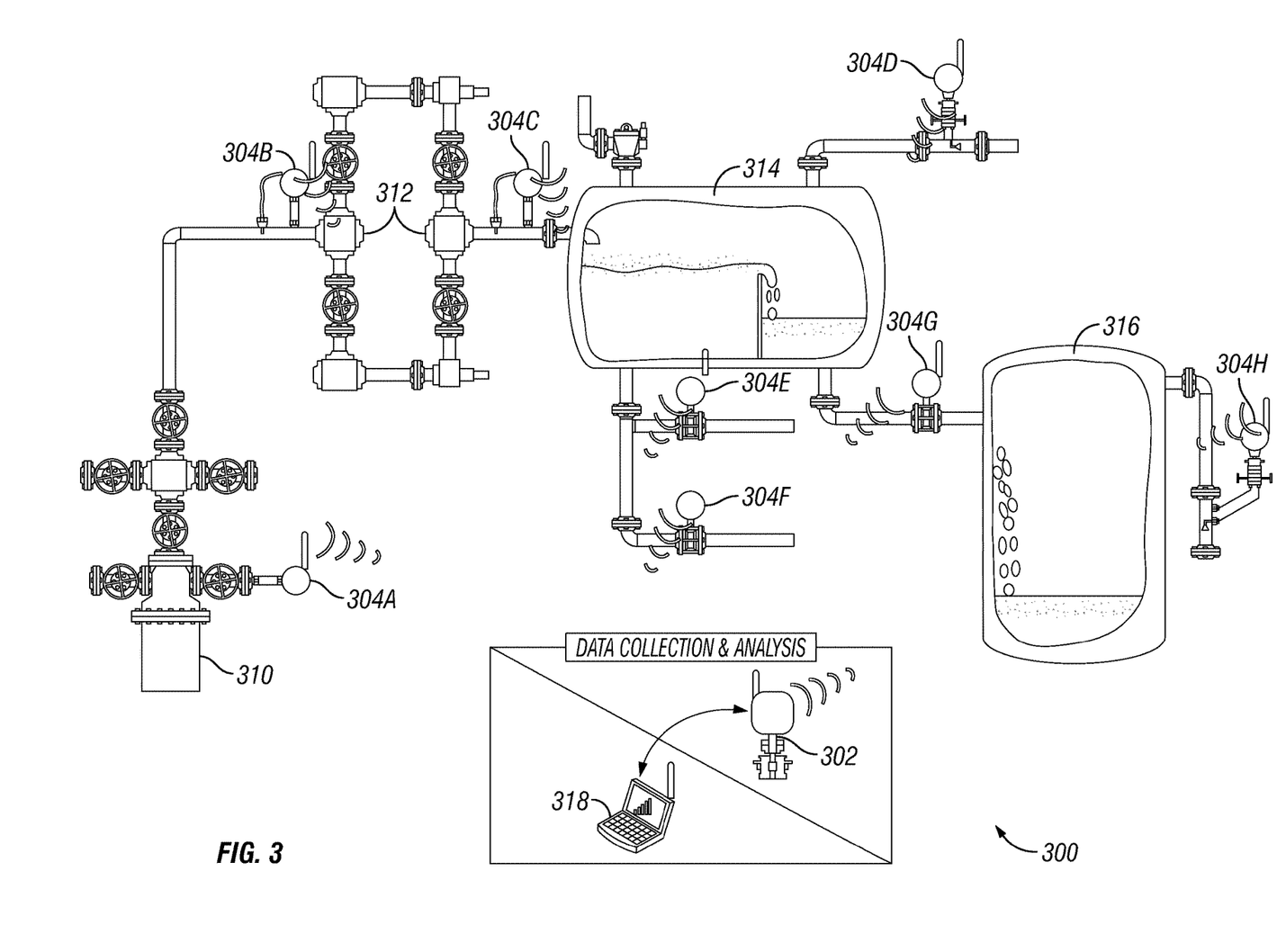
FIG. 3 shows a schematic view of a network in accordance with one or more embodiments of the present disclosure.

Accordingly, as shown in FIG. 3, a schematic view of a network 300 in accordance with one or more embodiments of the present disclosure is shown, in which one or more components of the network 300 may be included within a hazardous area, such as within a wellsite, as shown. The wireless network 300 may include an embedded device 302 with one or more additional devices 304 in communication with the embedded device 302.

As discussed above, the embedded device 302 and/or one or more of the others devices 304 may be used as a flow meter and/or any other type of measuring device known in the art to measure one or more properties and/or characteristics of the wellsite. For example, one or more of the devices 304 may be able to collect one or more measurements related to properties and/or characteristics related to flow through the wellsite. Accordingly, a packet, such as a data content packet including configuration data, real-time data, and/or archive data, may be created by one or more of the devices 304 to be stored or accessible through the device application module 232.

As such, with respect to FIG. 3, a first device 304A may be used to monitor and measure one or more properties and/or characteristics of a wellhead 310, such as to monitor and measure casing pressure. A second device 304B may be used to monitor and measure one or more properties and/or characteristics of material flowing into a choke manifold 312. A third device 304C may be used to monitor and measure one or more properties and/or characteristics of material flowing out of the choke manifold 312 and/or into a separator 314. A fourth device 304D may be used to monitor and measure one or more properties and/or characteristics of material, such as gas, flowing out of the separator 314. A fifth device 304E and/or a sixth device 304F may be used to monitor and measure one or more properties and/or characteristics of material, such as water, flowing out of the separator 314. A seventh device 304G may be used to monitor and measure one or more properties and/or characteristics of material, such as oil, flowing out of the separator 314 and/or into a surge tank 316. Further, an eighth device 304H may be used to monitor and measure one or more properties and/or characteristics of material, such as gas, flowing out of the surge tank 316.

The embedded device 302 may then be in communication with one or more of the slave devices 304. Further, a computer 318 may be in communication with the embedded device 302, such as to retrieve information with respect to the embedded device 302 and/or one or more of the devices 304. In such an embodiment, the computer 318 may communicate with the embedded device 302 through a user interface based upon the connectivity between the computer 318 and the embedded device 302. If the embedded device 302 is limited in connectivity, for example, and may only communicate with the embedded device through a serial connection, then the computer 318 may use the computer application 202 to communicate with the embedded device 302 through the application user interface 206. Otherwise, if the embedded device 302 has access to an internet connection, then the computer 318 may use the device module 204, which is installed on the embedded device 302, to communicate with the embedded device 302 through the device user interface 208.

Referring now back to FIG. 2, as the computer application 202 may be used with multiple types, versions, and/or kinds of devices that host the device module 204, the computer application 202 may include multiple versions of the single application binary file 218, and then access the appropriate version of the single application binary file 218 based upon the device hosted the device module 204 such that the single application binary file 218 and the single device binary file 224 are identical. For example, in one embodiment, the computer application 202 may include a version of the single application binary file 218 for version 1.0 and version 2.0 of an embedded device. If the device module 204 is hosted on version 1.0 of the embedded device, then the computer application 202 may access version 1.0 of the single application binary file 218, or if the device module 204 is hosted on version 2.0 of the embedded device, then the computer application 202 may access version 2.0 of the single application binary file 218. Further, if the computer application 202 does not include the appropriate version of the single application binary file 218 for the version of the embedded device used to host the device module 204, then the computer application 202 may request and/or the device module 204 may send the single device binary file 224 to the computer application 202. In such an embodiment, the single device binary file 224 may be sent over the serial connection 210, in which the computer application 202 may receive the single device binary file 224 from the embedded device and then save the single device binary file 224 as the single application binary file 218. This may ensure that the single application binary file 218 and the single device binary file 224 are identical, thereby enabling the application user interface 206 and the device user interface 208 to have identical features and functionality.

As a network in accordance with the present disclosure may be positioned within a hazardous area, such as within a wellsite, a device may be intrinsically safe and/or include an explosion proof enclosure. As such, in accordance with one or more embodiments of the present disclosure, "explosion proof," as used herein, is used in a context consistent with the National Fire Protection Association (NFPA) and the National Electric Code (NEC®), both of which have helped define the term "explosion proof." Definitions for several types of protection techniques acceptable when designing products for use in hazardous (classified) locations include, but are not limited to: explosion proof, dust ignition proof, dust tight, purged/pressurized, intrinsically safe, and hermetically sealed. These definitions set the criteria that must be met by all components installed in hazardous (classified) locations. As such, in accordance with one or more embodiments, to meet the criteria for the explosion proof rating, an enclosure is be able to contain any explosion originating within its housing and to prevent sparks from within its housing from igniting vapors, gases, dust, and/or fibers in the air surrounding it. Therefore, explosion proof, when referring to electrical enclosures, does not mean that it is able to withstand an exterior explosion. Instead, it is the enclosures ability to prevent an internal spark or explosion from causing a much larger blast. Additionally, in one or more embodiments, an explosion proof enclosure is able to meet the temperature requirements of the specific application in which it is to be installed. This means that the operating temperature of the motor (and its enclosure) or other component cannot be greater than the lowest ignition/combustion temperature of the gases or dusts in the atmosphere where the component is to be installed.

An apparatus in accordance with the present disclosure may provide one or more of the following advantages. An apparatus in accordance with the present disclosure may be intrinsically safe such that the apparatus may be used within a hazardous environment. The apparatus as discussed and described above may be limited in the maximum energy stored, power consumption, and/or used with the apparatus to prevent sparking or excessive heat. For example, a user interface management system of the present disclosure may be capable of consuming only very low amounts of power for extended periods of time. Further, an embodiment of the present disclosure may prevent having to create multiple programs or files to create multiple user interfaces, as the same file may be used to create multiple user interfaces at different locations, systems, and/or through different mediums of connectivity, independent of bandwidth connectivity (e.g., a user may interact with an identical user interface through an internet/network connection and/or through a serial connection). Furthermore, an embodiment of the present disclosure may enable an updated and/or correct version of a user interface may be used with a particular version of a device, as needed.

Those of skill in the art would understand that information and signals may be represented using any of a variety of different technologies and techniques. For example, data, instructions, commands, information, signals, bits, symbols, communications, and chips that may be referenced throughout the above description may be represented by voltages, currents, electromagnetic waves, magnetic fields or particles, optical fields or particles, or any combination thereof. As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a component, block, unit, module, circuit, system, or step. Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, RAM, ROM, an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, RF, etc.

Computer program code for carrying out operations of the present disclosure may be written in a programming language, such as a web-based or internet supported programming language, including HTML, Java or JavaScript, Smalltalk, C#, C++, or the like. However, the computer program code for carrying out operations of the present disclosure may also be written in conventional procedural programming languages, such as the "C" programming language or similar programming languages. For example, the device user interface may be implemented using programming code based on web standards, which may include HTML, CSS (Cascading Style Sheets), Javascript, AJAX, XML, or the like. Further, as the application user interface may be created from the same binary file, the application user interface may be written in these same programming languages. The computer application may also be written in conventional procedural programming languages such, as C#, C++, C, or the like.

In one or more embodiments, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider). Additionally or alternatively, computers, such as a user's computer and a remote computer (such as a device), may be connected only through a serial connection, in which the computers serially communicate with each other.

The present disclosure is described with reference to flowchart illustrations and/or block diagrams of methods, apparatus, systems, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the present disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the present disclosure. One skilled in the relevant art will recognize, however, that the present disclosure may be practiced without one or more of the specific details, or with other methods, components, materials, and so forth. In other instances, well-known structures, materials, or operations are not shown or described in detail to avoid obscuring aspects of the present disclosure.

Although the present invention has been described with respect to specific details, it is not intended that such details should be regarded as limitations on the scope of the invention, except to the extent that they are included in the accompanying claims.

What is claimed is:

1. A method to manage user interfaces within a network, the method comprising:
    creating an application user interface based upon data content included within a single application binary file;
    serving the application user interface;
    creating a device user interface based upon data content included within a single device binary file;
    serving the device user interface;
    receiving a data request from the application user interface;
    compiling, based on the data request, a data content packet comprising the data content included within the single device binary file; and
    providing the data content packet to satisfy the data request, wherein:
    the data content of the single application binary file and the data content of the single device binary file are identical;
    the application user interface is configured to receive and satisfy user input requests to provide a first user experience; and
    the device user interface is configured to receive and satisfy the user input requests to provide a second user experience, the first user experience identical to the second user experience; and
    the data content packet includes an error detection portion configured to be (i) removed from the data content packet by stripping the data content packet with a device serial formatter for serial communication across a serial connection, and (ii) added to the data content packet by de-stripping the data content packet with an application serial formatter after the serial communication.

2. The method of claim 1, wherein:
    the application user interface is served to an application client through an application web server from an application computer; and
    the application computer and an embedded device are connected through the serial connection.

3. The method of claim 2, wherein the embedded device comprises a flow computer in communication with a flow meter.

4. The method of claim 2, further comprising:
    receiving a data content request through the application user interface; and determining if the single application binary file comprises data content corresponding to the data content request.

5. The method of claim 4, further comprising:
    retrieving the data content from the single application binary file if the single application binary file comprises the data content corresponding to the data content request;
    retrieving the data content through the serial connection from a device application module of the embedded device if the single application binary file does not comprise the data content corresponding to the data content request; and
    serving the data content through the application user interface.

6. The method of claim 5, wherein the retrieving the data content through the serial connection comprises:
    compiling the data content packet comprising the data content;
    stripping the data content packet with the device serial formatter;
    sending the data content packet across the serial connection; and
    de-stripping the data content packet with the application serial formatter.

7. The method of claim 6, wherein:
    the stripping the data content packet comprises at least one of:
        removing a header portion from the data content packet;
        and removing a footer portion from the data content packet; and
    the de-stripping the data content packet comprises at least one of:
        adding the header portion to the data content packet;
        and adding the footer portion to the data content packet.

8. The method of claim 4, wherein the data content comprises at least one of configuration data, real-time data, and archive data.

9. The method of claim 8, wherein at least one of the real-time data and the archive data comprise data of a flow rate and a property measured by the embedded device, and wherein the configuration data comprises data of an internal pipe diameter and mole fraction of material associated with the embedded device.

10. The method of claim 2, wherein the embedded device is positioned within a hazardous area, and wherein the hazardous area comprises a wellsite.

11. The method of claim 1, further comprising:
    saving a single binary file as the single application binary file at an application computer; and
    saving the single binary file as the single device binary file at an embedded device.

12. The method of claim 11, wherein the single binary file comprises a plurality of content files indexed within the single binary file, and wherein the single binary file comprises a web-based programming language.

13. The method of claim 1, further comprising:
    receiving the single device binary file from an embedded device to an application computer through the serial connection; and
    saving the single device binary file as the single application binary file at the application computer.

14. A method to manage user interfaces within a network, the method comprising:
- creating a device user interface at an embedded device based upon a single device binary file stored at the embedded device;
- serving the device user interface to a user client through a device web server from the embedded device;
- sending the single device binary file from the embedded device to an application computer through a serial connection to create an application user interface at the application computer;
- receiving a data request from the application user interface;
- compiling, based on the data request, a data content packet comprising data content included within the single device binary file; and
- providing data from the embedded device to the application user interface to satisfy the data request, wherein the device user interface and the application user interface are configured to be identical;
- wherein the application user interface is configured to receive and satisfy user input requests to provide a first user experience;
- wherein the device user interface is configured to receive and satisfy the user input requests to provide a second user experience, the first user experience identical to the second user experience, and
- wherein the data content packet includes an error detection portion configured to be (i) removed from the data content packet by stripping the data content packet with a device serial formatter for serial communication across the serial connection, and (ii) added to the data content packet by de-stripping the data content packet with an application serial formatter after the serial communication.

15. The method of claim 14, further comprising:
- saving the sent single device binary file as a single application binary file at the application computer;
- creating the application user interface based upon the single application binary file at the application computer;
- serving the application user interface from the application computer; and wherein the single application binary file and the single device binary file comprise identical data content.

16. The method of claim 15, wherein:
the application user interface is served to an application client through an application web server from the application computer.

17. The method of claim 15, further comprising:
- receiving a data content request through the application user interface; determining if the single application binary file comprises data content corresponding to the data content request;
- retrieving the data content from the single application binary file if the single application binary file comprises the data content corresponding to the data content request;
- retrieving the data content through the serial connection from a device application module of the embedded device if the single application binary file does not comprise the data content corresponding to the data content request; and
- serving the data content through the application user interface.

18. The method of claim 17, wherein the retrieving the data content through the serial connection comprises:
- compiling the data content packet comprising the data content; stripping the data content packet with the device serial formatter; sending the data content packet across the serial connection; and
- de-stripping the data content packet with the application serial formatter.

19. A non-transitory machine-readable medium comprising code, the code for managing user interfaces within a network, wherein the code is executable to perform:
- creating a device user interface at an embedded device based upon a single device binary file stored at the embedded device;
- serving the device user interface to a user client through a device web server from the embedded device;
- sending the single device binary file from the embedded device to an application computer through a serial connection to create an application user interface at the application computer;
- receiving a data request from the application user interface;
- compiling, based on the data request, a data content packet comprising the data content included within the single device binary file; and
- providing data from the embedded device to the application user interface to satisfy the data request, wherein the device user interface and the application user interface are configured to be identical;
- wherein the application user interface is configured to receive and satisfy user input requests to provide a first user experience;
- wherein the device user interface is configured to receive and satisfy the user input requests to provide a second user experience, the first user experience identical to the second user experience, and
- wherein the data content packet includes an error detection portion configured to be (i) removed from the data content packet by stripping the data content packet with a device serial formatter for serial communication across a serial connection, and (ii) added to the data content packet by de-stripping the data content packet with an application serial formatter after the serial communication.

20. The machine-readable medium of claim 19, wherein the application user interface is served to an application client through an application web server from the application computer.

* * * * *